(12) United States Patent
Killian

(10) Patent No.: US 6,327,277 B1
(45) Date of Patent: Dec. 4, 2001

(54) METHOD FOR CONTROLLING THE WAVELENGTH OF AN OPTICAL FIBER-BASED LIGHT SOURCE

(75) Inventor: Kevin Mark Killian, Hillsdale, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/215,834

(22) Filed: Dec. 17, 1998

(51) Int. Cl.$^7$ .............................. H01S 3/30; H01S 3/13; H01S 5/00; G02B 6/26; G01B 9/02
(52) U.S. Cl. .................. 372/6; 372/29.01; 372/29.02; 372/43; 356/345; 385/15
(58) Field of Search ...................... 372/6, 29.01, 32, 372/69, 39, 70, 75, 29.02, 43; 356/345; 385/15

(56) References Cited

U.S. PATENT DOCUMENTS

| | | | |
|---|---|---|---|
| 5,136,600 | 8/1992 | Fidric, et al. | 372/32 |
| 5,177,562 | 1/1993 | Wysocki, et al. | 356/350 |
| 5,684,590 | 11/1997 | Sanders, et al. | 586/19 |

FOREIGN PATENT DOCUMENTS 2 278 230    11/1994   (GB) ...................... H01S/3/131

*Primary Examiner*—Leon Scott, Jr.
*Assistant Examiner*—Armando Rodriguez
(74) *Attorney, Agent, or Firm*—Loria B. Yeadon

(57) ABSTRACT

The output wavelength of a laser-diode pumped fiber source can be stabilized at its minimum value irrespective of temperature and the age of the laser diode by the seeking the minimum output wavelength of the fiber source. By introducing a dither on the temperature of the pump laser diode, a measurement feedback loop can be used to determine the optimal value of the temperature. Once determined, the temperature is used to fix the wavelength of the source.

9 Claims, 2 Drawing Sheets

METHOD FOR CONTROLLING THE WAVELENGTH OF AN OPTICAL FIBER-BASED LIGHT SOURCE

BACKGROUND OF THE INVENTION

The apparatus and method described here enables one to stabilize the wavelength of the output of a fiber light source, such as an erbium-doped superfluorescent source. In turn, this will improve the scale-factor stability of an interferometric optical sensor.

DESCRIPTION OF THE INVENTION

Fiber light sources are disclosed in U.S. Pat. No. 5,136,600, issued on Aug. 4, 1992, to Fidric et al. for a Stabilization Apparatus and Method for an SFS, and U.S. Pat. No. 5,177,562, issued on Jan. 5, 1993, to Wysocki et al. for a Stability Compensated Broadband Source and Fiber Interferometer, incorporated by reference herein. Optical fiber sources use a length of rare earth element-doped optical fiber energized or "pumped" by a "pump" light source. The pump light source produces light having a wavelength in the "absorption band" of the fiber. When the light from the pumped source is absorbed by the fiber, spontaneous emission occurs and light is produced in the "emission band" of the fiber.

Figure 1:
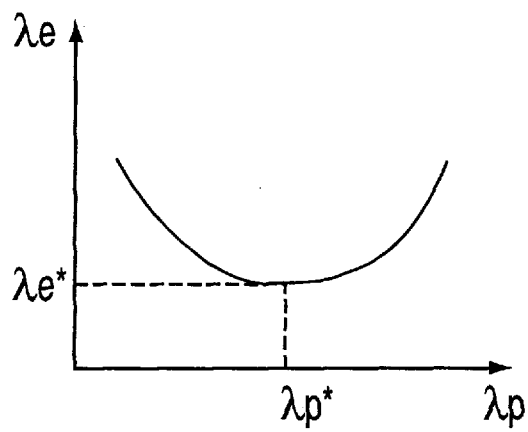
FIG. 1 is a graph of the typical characteristic of the output wavelength vs. the pump source wavelength in a fiber light source.

The typical characteristic of the output wavelength vs. the pump source wavelength is shown in FIG. 1. This curve shows that there is a unique emitted wavelength $\lambda_e^*$ for a given pump source. The relationship can be expressed in equation form as:

$$\lambda_e = a\,(\lambda_p - \lambda_p^*)^2 + b \tag{1}$$

where $\lambda_e$ is the emission wavelength;
$\lambda_p$ is the actual pump wavelength;
$\lambda_p^*$ is the characteristic pump wavelength; and
a and b are constants.

Figure 2:
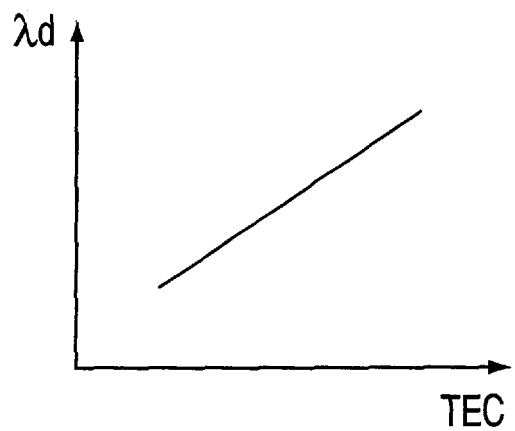
FIG. 2 is a graph of the relationship between the cooler temperature and the laser diode wavelength for a laser diode pump source.

The pump source in a fiber light source is typically a laser diode mounted on a thermoelectric cooler. By varying the temperature of the cooler, the laser diode output wavelength can be altered. The relationship between the cooler temperature and the laser diode wavelength is generally linear, as illustrated in FIG. 2, and can be expressed as:

$$\lambda_d = a'T_{TEC} + b' \tag{2}$$

where a' and b' are constants.
As the laser diode ages or is exposed to different environments, its behavior may change, perhaps causing the slope and intercept of the curve of FIG. 2 to change. This will alter the wavelength of the fiber light source output.

Figure 3:
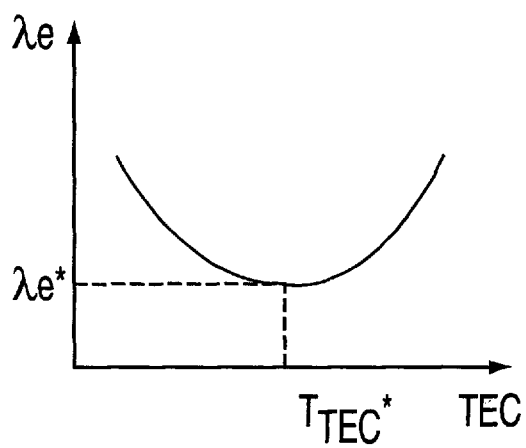
FIG. 3 is a graph of the relationship between the thermoelectric cooler temperature and the output wavelength of a fiber light source.

Since the diode output wavelength is linearly proportional to the thermoelectric cooler temperature, thermoelectric cooler temperature can be substituted for the fiber pump wavelength. Combining FIGS. 1 and 2, as shown in FIG. 3, the output wavelength is at a minimum value at a single value of the cooler temperature, as also expressed in the following equation:

$$\lambda_e = a''(T_{TEC} - T_{TEC}^*)^2 + b'' \tag{3}$$

where $T_{TEC}$ is the actual thermoelectric cooler temperature;
$T_{TEC}^*$ is the characteristic thermoelectric cooler temperature; and
a" and b" are constants.

Thus, there is one value $T_{TEC}^*$ of thermoelectric cooler temperature at which the fiber will have a unique emission wavelength $\lambda_e^*$.

An optical interferometer with a controllable optical phase shifter can be used to determine when the unique emission wavelength has been reached. One suitable such interferometer is the Sagnac interferometer, described in U.S. Pat. No. 5,278,631, issued Jan. 11, 1994, to Hollinger et al., for a Closed Loop Fiber Optic Gyroscope with Signal Processing Arrangement for Improved Performance; U.S. Pat. No. 5,280,339 issued Jan. 18, 1994, to Hollinger et al., for a Closed Loop Fiber Optic Gyroscope with Fine Angle Resolution; and U.S. Pat. No. 5,309,220, issued May 3, 1994, to Hollinger et al., for a Closed Loop Fiber Optic Gyroscope with Reduced Sensitivity to Electronic Drift; all incorporated herein by reference.

The phase shift imparted in the interferometer by the phase shifter is:

$$\phi = 2\pi n L / \lambda \tag{4}$$

where $\phi$ is the imparted phase shift;
n is the waveguide index of refraction;
L is the length of the phase shifter region; and
$\lambda$ is the wavelength of the fiber.

The phase shifter alters the phase by changing the index of refraction in response to an input voltage. The relationship between the input voltage and the phase shift can be stated as:

$$\Delta n = K \Delta V \tag{5}$$

where K is a constant describing the phase shifter transfer function.

The phase shift can then be stated as a function of input voltage by combining Eqs. 4 and 5:

$$\Delta\phi = 2\pi K \Delta V L / \lambda \tag{6}$$

For a phase shift of $2\pi$, the voltage shift (known as the "$2\pi$ voltage") is:

$$\Delta V_{2\pi} = \lambda / (KL) \tag{7}$$

Thus, the voltage applied to the phase shifter to obtain a $2\pi$ phase shift will be proportional to the wavelength of the source. The relationship between the $2\pi$ voltage and the cooler temperature can be determined by substituting $\lambda_e$ in Equation 3 for $\lambda$ in Equation 7:

$$V_{2\pi} = [a''(T_{TEC} - T_{TEC}^*)^2 + b''] / (KL) \tag{8}$$

where $V_{2\pi}$ is the voltage applied to the phase shifter.

Figure 4:
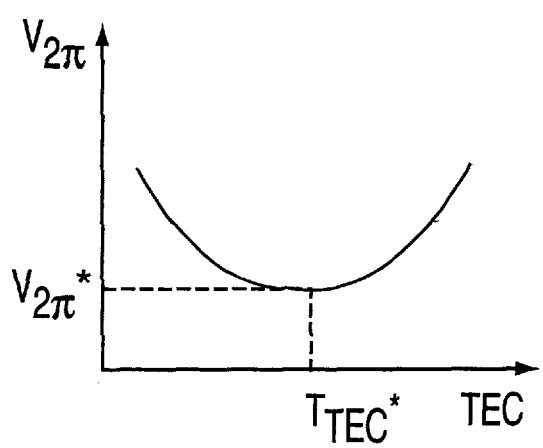
FIG. 4 is a graph of the relationship between the thermoelectric cooler temperature and the 2B voltage applied to a phase shifter in an optical interferometer.

The curve in FIG. 4 illustrates this relationship.

The voltage $V_{2\pi}$ can be monitored to provide an indication of the fiber emission wavelength. Thus, to find $\lambda_e^*$ regardless of the condition of the pump laser diode, one need only determine when $V_{2\pi}$ is at a minimum, i.e., $V_{2\pi}^*$. A circuit arrangement that will achieve this is illustrated in FIG. 5.

A laser diode 10 excites a fiber light source 20. The temperature of the laser diode 10 is maintained by a thermoelectric cooler 12 controlled by a thermoelectric cooler controller 14. In the system of FIG. 5, the light output of the fiber light source 20 passes through a directional coupler 30 into an optical interferometer 40 with a controllable optical phase shifter 42.

The output of the interferometer 40 passes through the coupler 30 to a photo detector 50. The photo detector 50 produces an error voltage proportional to the phase difference in the interferometer. This error voltage is processed by a peak-to-peak detector 60, an integrator 70, and a ramp generator 80, the last component generating an error signal for the phase shifter 42. The interferometer 40, the photo detector 50, the peak-to-peak detector 60, the integrator 70, the ramp generator 80, and the phase shifter 42 collectively comprise a rate feedback loop 90. A dither signal generator 92 introduces a square wave dither signal in the loop at a summing node 94 and also provides a synchronization signal for the peak-to-peak detector 60.

Figure 5:
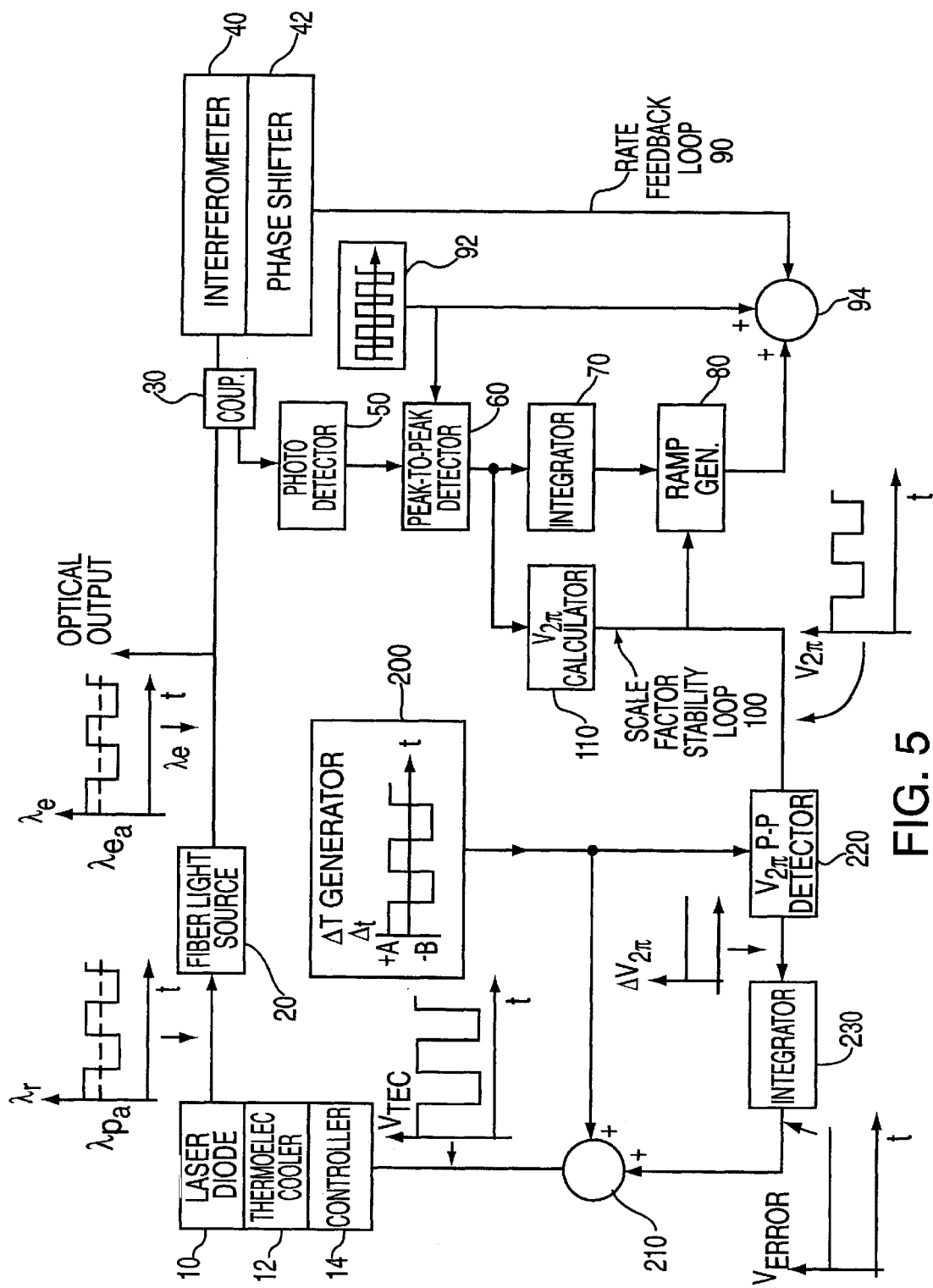
FIG. 5 is a schematic diagram of an optical fiber source with emission wavelength stabilization.

The voltage $V_{2\pi}$ is generated by a scale factor stability loop 100, discussed and shown in detail in FIG. 5 of U.S. Pat. No. 5,278,631. In FIG. 5, the scale factor stability loop 100 comprises a $V_{2\pi}$ calculator 110. The value $V_{2\pi}$ is the voltage required for the phase shifter 42 to impart a $2\pi$ phase shift to the light traveling through it. Since the output of the interferometer 40 is characterized by a cosine function, a phase change of $2\pi$ results in no change in the output. Additionally, a change in the wavelength of the light entering the interferometer 40 will be reflected in the output of the photo detector 50 and ultimately in the detected value $\Delta V_{2\pi}$. Therefore, changes in this value can be used to track changes in wavelength of the fiber light source 20.

A $\Delta T$ generator 200 generates a square wave signal that dithers the voltage passing through summing node 210 and applied to the thermoelectric cooler controller 14, causing the temperature of the cooler 12 to dither between a high temperature state "a" and a low temperature state "b." This causes the wavelength $\lambda$ of the output of the laser diode 10 to vary proportionately and, in turn, the output wavelength $\lambda_e$ of the fiber light source 20 varies.

Assuming constant rate input to the interferometer 40, the rate feedback loop 90 stabilizes, but the value of $V_{2\pi}$ varies proportionately with the output wavelength $\lambda_e$ of the light source 20 (see Eq. 7 above). The $V_{2\pi}$ voltage is then demodulated in a $V_{2\pi}$ peak-to-peak detector 220 against the output of the $\Delta T$ generator 200, and the difference is integrated by an integrator 230, yielding the cumulative error over time. The error signal is fed back to the thermoelectric cooler controller 14 to drive the error to zero. When the value of $T_{TEC}^*$, the characteristic thermoelectric cooler temperature, reaches the null point, $\Delta V_{2\pi}$ will be zero, and the wavelength will then be stabilized. At this value of $T_{TEC}^*$, the value of $V_{2\pi}$ is stabilized and the output wavelength $\lambda_e$ of the fiber light source 20 is at its desired value, and therefore the operating temperature for the thermoelectric cooler 12 is optimal.

What is claimed is:

1. An apparatus for stabilizing the emission wavelength of a fiber light source pumped by a laser diode, comprising:
   means for introducing a dither in the emission wavelength of the laser diode;
   means coupled to the fiber light source for determining the emission wavelength of the fiber light source;
   means coupled to the means for determining the emission wavelength of the fiber light source for determining the average emission wavelength of the fiber light source with respect to the dither; and
   means coupled to the means for determining the average emission wavelength for adjusting the emission wavelength of the laser diode until the average emission wavelength equals the minimum emission wavelength.

2. An apparatus as set forth in claim 1, where the means for determining the average emission wavelength of the fiber light source comprises means for determining the peak values of the light source emission wavelength with respect to the peak values of the dither; and
   the means for adjusting the emission wavelength of the laser diode comprises means for adjusting the emission wavelength of the laser diode until the respective peak values of the light source emission wavelength are equal.

3. An apparatus as set forth in claim 1, where the laser diode is a temperature-adjustable thermoelectrically-cooled laser diode and the means for introducing a dither in the emission wavelength of the laser diode comprises means for introducing a dither in the temperature of the laser diode.

4. An apparatus as set forth in claim 1, where the means for determining the emission wavelength of the fiber light source includes an interferometer.

5. An apparatus as set forth in claim 4, where the interferometer comprises means for generating a voltage proportional to changes in the emission wavelength of the fiber light source.

6. An apparatus for stabilizing the emission wavelength of a fiber light source pumped by a temperature-adjustable thermoelectrically cooled laser diode, comprising:
   means for introducing a dither in the emission wavelength of the laser diode, the means for introducing a dither comprising means for introducing a dither in the temperature of the laser diode;
   an interferometer coupled to the light source and responsive to changes in the emission wavelength of the fiber light source, the interferometer generating a voltage proportional to changes in the emission wavelength of the fiber light source;
   means coupled to the interferometer for determining the peak values of the light source emission wavelength with respect to peak values of the dither; and
   means coupled to said determining means for adjusting the temperature of the laser diode until the respective peak values of the light source emission wavelength are equal.

7. A method for stabilizing the emission wavelength of a fiber light source pumped by a laser diode, comprising the steps of:
   introducing a dither in the emission wavelength of the laser diode;
   determining the emission wavelength of the fiber light source;
   responsive to the determination of the emission wavelength of the fiber light source, determining the average emission wavelength of the fiber light source with respect to the dither; and responsive to the determination of the average emission wavelength, adjusting the emission wavelength of the laser diode until the average emission wavelength equals the minimum emission wavelength.

8. A method as set forth in claim 7, where the step of determining the average emission wavelength of the fiber light source comprises the step of determining the peak values of the light source emission wavelength with respect to the peak values of the dither; and the step of adjusting the emission wavelength of the laser diode comprises the step of adjusting the emission wavelength of the laser diode until the respective peak values of the light source emission wavelength are equal.

9. A method for stabilizing the emission wavelength of a fiber light source pumped by a temperature-adjustable thermoelectrically-cooled laser diode, comprising:

introducing a dither in the emission wavelength of the laser diode, the step of introducing a dither comprising the step of introducing a dither in the temperature of the laser diode;

determining the emission wavelength of the fiber light source;

determining the peak values of the light source emission wavelength with respect to the peak values of the dither; and adjusting the temperature of the laser diode until the respective peak values of the light source emission wavelength are equal.

* * * * *